US009211907B2

(12) United States Patent
Kubo et al.

(10) Patent No.: US 9,211,907 B2
(45) Date of Patent: Dec. 15, 2015

(54) SOLENOID VALVE DEVICE, HYDRAULIC APPARATUS EQUIPPED WITH THE SOLENOID VALVE DEVICE, AND HYDRAULIC POWER STEERING SYSTEM EQUIPPED WITH THE HYDRAULIC APPARATUS

(75) Inventors: Ryouichi Kubo, Kashihara (JP); Masahiko Sakamaki, Yao (JP)

(73) Assignee: JTEKT CORPORATION, Osaka-shi (JP)

( * ) Notice: Subject to any disclaimer, the term of this patent is extended or adjusted under 35 U.S.C. 154(b) by 807 days.

(21) Appl. No.: 13/428,471

(22) Filed: Mar. 23, 2012

(65) Prior Publication Data

US 2012/0247864 A1    Oct. 4, 2012

(30) Foreign Application Priority Data

Apr. 4, 2011    (JP) .................................. 2011-083092

(51) Int. Cl.
*B62D 5/09*    (2006.01)
*B62D 5/065*    (2006.01)

(52) U.S. Cl.
CPC . *B62D 5/09* (2013.01); *B62D 5/065* (2013.01)

(58) Field of Classification Search
CPC .................................. B62D 5/09; B62D 5/065
USPC .......................... 91/459, 375 R, 365; 180/422
See application file for complete search history.

(56) References Cited

U.S. PATENT DOCUMENTS

| | | | | |
|---|---|---|---|---|
| 4,633,963 A | * | 1/1987 | Hasegawa ...................... | 180/421 |
| 4,651,118 A | * | 3/1987 | Zeuner et al. .................. | 335/258 |
| 6,039,133 A | * | 3/2000 | Zulu ............................. | 180/6.64 |
| 6,193,009 B1 | * | 2/2001 | Chino et al. ................... | 180/441 |
| 6,263,915 B1 | | 7/2001 | Hayashi et al. | |
| 6,499,336 B1 | * | 12/2002 | Raffer ........................... | 73/54.28 |
| 7,434,655 B2 | * | 10/2008 | Soeda ........................... | 180/441 |
| 2010/0200785 A1 | | 8/2010 | Goto | |

FOREIGN PATENT DOCUMENTS

| | | |
|---|---|---|
| EP | 0 686 541 A1 | 12/1995 |
| JP | S61-094870 A | 5/1986 |
| JP | H02-304284 A | 12/1990 |
| JP | A-03-296615 | 12/1991 |
| JP | H04-221272 A | 8/1992 |
| JP | H06-239254 A | 8/1994 |
| JP | H07-158602 A | 6/1995 |

(Continued)

OTHER PUBLICATIONS

Nov. 29, 2013 Extended Search Report issued in European Patent Application No. 12161354.1.

(Continued)

*Primary Examiner* — Dwayne J White
*Assistant Examiner* — Logan Kraft
(74) *Attorney, Agent, or Firm* — Oliff PLC

(57) ABSTRACT

A solenoid valve device includes: a solenoid valve that includes a solenoid that is supplied with driving current to generate magnetic flux, and a valve element that is moved by the magnetic flux generated from the solenoid; and a control device that controls the solenoid valve. The control device includes an alternating current component in the driving current and supplies the driving current including the alternating current component to the solenoid, and detects an impedance of the solenoid.

10 Claims, 9 Drawing Sheets

(56) References Cited

FOREIGN PATENT DOCUMENTS

| | | |
|---|---|---|
| JP | A-2001-027359 | 1/2001 |
| JP | 2001-264004 A | 9/2001 |
| JP | 2005-317612 A | 11/2005 |
| JP | 2006-275235 A | 10/2006 |
| JP | A-2009-30701 | 2/2009 |
| JP | A-2009-079644 | 4/2009 |
| WO | WO 2009/017196 A1 | 2/2009 |

OTHER PUBLICATIONS

Feb. 3, 2015 Office Action issued in Japanese Application No. 2011-083092.

Aug. 25, 2015 Office Action issued in Japanese Application No. 2011-083092.

* cited by examiner

US 9,211,907 B2

SOLENOID VALVE DEVICE, HYDRAULIC APPARATUS EQUIPPED WITH THE SOLENOID VALVE DEVICE, AND HYDRAULIC POWER STEERING SYSTEM EQUIPPED WITH THE HYDRAULIC APPARATUS

INCORPORATION BY REFERENCE/RELATED APPLICATION

This application claims priority to Japanese Patent Application No. 2011-083092 filed on Apr. 4, 2011 the disclosure of which, including the specification, drawings and abstract, is incorporated herein by reference in its entirety.

BACKGROUND OF THE INVENTION

1. Field of the Invention

The invention relates to a solenoid valve device that includes a solenoid that is supplied with driving current to generate magnetic flux and a valve element that is moved by the magnetic flux generated from the solenoid, a hydraulic apparatus equipped with the solenoid valve device, and a hydraulic power steering system equipped with the hydraulic apparatus.

2. Discussion of Background

For example, Japanese Patent Application Publication No. 2009-079644 (JP 2009-079644 A) describes a conventional solenoid valve. An example of how a solenoid valve is used is as follows: the solenoid valve is used to provide communication between a first hydraulic chamber and a second hydraulic chamber within a hydraulic cylinder of a hydraulic power steering system.

In order to further accurately control the solenoid valve, it is necessary to detect the position of a valve element. For example, a mechanical position sensor may be used to detect the position of the valve element. In this case, however, the position sensor may contact the valve element, resulting in interfere with movement of the valve element.

SUMMARY OF THE INVENTION

It is an object of the invention to provide a solenoid valve device configured to suppress interference with movement of a valve element, which may occur when the position of the valve element is detected, a hydraulic apparatus equipped with the solenoid valve device, and a hydraulic power steering system equipped with the hydraulic apparatus.

According to a feature of an example of the invention, when driving current, including an alternating current component, is supplied to a solenoid and a valve element is moved by magnetic flux generated from the solenoid, an impedance of the solenoid changes on the basis of a distance between the solenoid and the valve element. It is possible to determine a position of the valve element with respect to the solenoid on the basis of a change in the impedance.

According to another feature of an example of the invention, where a relationship between a driving current and an impedance at the time when the driving current matches the operation of the valve element is defined as a reference position index, when a relationship between a driving current supplied to the solenoid and an impedance detected as the driving current is supplied differs from the reference position index, supply of the driving current the solenoid is stopped.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
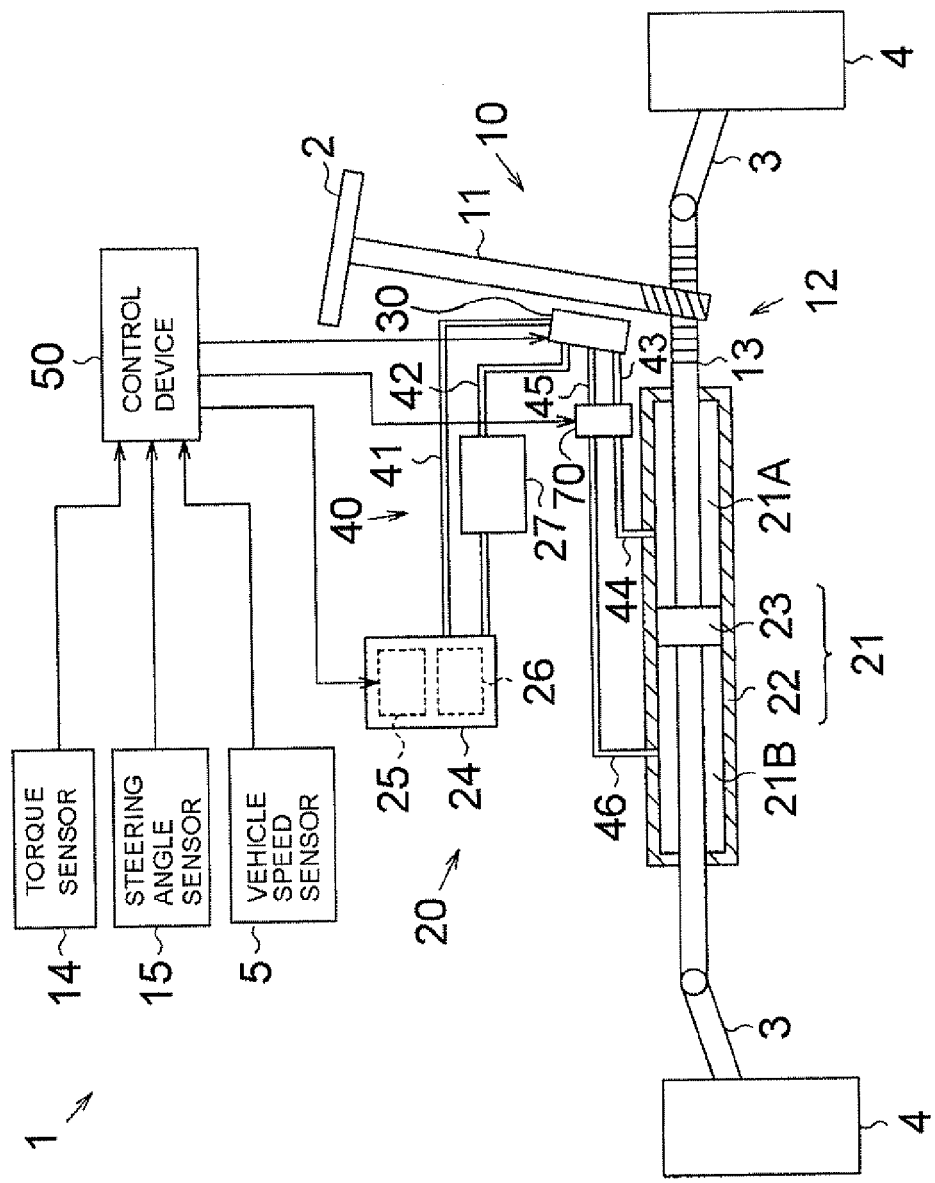
FIG. 1 is a view that schematically shows the overall structure of a hydraulic power steering system according to the invention.

Hereinafter, an embodiment of the invention will be described with reference to the accompanying drawings.

The structure of a hydraulic power steering system 1 will be described with reference to FIG. 1. The hydraulic power steering system 1 includes a steering device 10, an assist device 20 and a control device 50. The steering device 10 transmits operation of a steering wheel 2 to steered wheels 4. The assist device 20 supplies part of the force required to operate the steering wheel 2, thereby assisting a driver in operating the steering wheel 2. The control device 50 controls the assist device 20.

The steering device 10 includes a steering shaft 11, a rack-and-pinion mechanism 12 and a steered shaft 13. The steering shaft 11 rotates together with the steering wheel 2. The rack-and-pinion mechanism 12 converts rotation of the steering shaft 11 into reciprocal linear motion. The steered shaft 13 moves in the axial direction in response to the operation of the rack-and-pinion mechanism 12.

The control device 50 controls an electric pump 24, a flow-rate control valve 30, a solenoid valve 70, and the like, of the assist device 20 on the basis of signals output from a torque sensor 14, a steering angle sensor 15 and a vehicle speed sensor 5.

The torque sensor 14 outputs a signal, corresponding to a steering torque applied to the steering shaft 11, to the control device 50. The steering angle sensor 15 outputs a signal, corresponding to the rotation angle of the steering shaft 11, that is, the steering angle, to the control device 50. The vehicle speed sensor 5 outputs a signal, corresponding to the rotation speed of the steered wheels 4, to the control device 50.

The hydraulic power steering system 1 operates as follows. When torque is input into the steering wheel 2 by the driver, the steering shaft 11 rotates together with the steering wheel 2. The rotation of the steering shaft 11 is converted into the linear motion of the steered shaft 13 in its axial direction by the rack-and-pinion mechanism 12. The steered shaft 13 is moved in the axial direction by force transmitted from the rack-and-pinion mechanism 12. Then, as the steered shaft 13 moves in the axial direction, the steered angle of the steered wheels 4 is changed via tie rods 3.

In addition, when the steering wheel 2 is operated, the hydraulic pressure of the assist device 20 is controlled to thereby apply axial force to the steered shaft 13. Thus, a force required to operate the steering wheel 2 to move the steered shaft 13 in the axial direction is reduced. That is, the assist device 20 supplies part of the force required to operate the steering wheel 2, thereby assisting the driver in operating the steering wheel 2.

The structure of the assist device 20 will be described. The assist device 20 includes a hydraulic cylinder 21, the electric pump 24, the flow-rate control valve 30 and a reservoir tank 27. The hydraulic cylinder 21 applies hydraulic pressure to the steered shaft 13. The electric pump 24 supplies hydraulic oil to the hydraulic cylinder 21. The flow-rate control valve 30 controls the manner in which hydraulic oil is supplied to or drained from the hydraulic cylinder 21. The reservoir tank 27 stores hydraulic oil. In addition, the assist device 20 includes the solenoid valve 70 and an oil passage 40. The solenoid valve 70 causes the hydraulic oil to flow between a first hydraulic chamber 21A and a second hydraulic chamber 21B of the hydraulic cylinder 21. The oil passage 40 provides communication among these components.

The oil passage 40 includes following oil passages 41 to 46. The first oil passage 41 provides communication between the reservoir tank 27 and a supply port 63 (see FIG. 3) of the flow-rate control valve 30 via the electric pump 24. The second oil passage 42 provides communication between a drain port 64 (see FIG. 3) of the flow-rate control valve 30 and the reservoir tank 27. The third oil passage 43 provides communication between a first port 61 (see FIG. 3) of the flow-rate control valve 30 and the solenoid valve 70. The fourth oil passage 44 provides communication between the solenoid valve 70 and the first hydraulic chamber 21A of the hydraulic cylinder 21. The fifth oil passage 45 provides communication between a second port 62 (see FIG. 3) of the flow-rate control valve 30 and the solenoid valve 70. The sixth oil passage 46 provides communication between the solenoid valve 70 and the second hydraulic chamber 21B of the hydraulic cylinder 21.

The hydraulic cylinder 21 includes a housing 22 and a piston 23. The steered shaft 13 extends through the housing 22. The piston 23 is fixed to the steered shaft 13. The space inside the housing 22 is partitioned by the piston 23 into two hydraulic chambers, that is, the first hydraulic chamber 21A and the second hydraulic chamber 21B. The first hydraulic chamber 21A is in communication with the solenoid valve 70 via the fourth oil passage 44. The second hydraulic chamber 21B is in communication with the solenoid valve 70 via the sixth oil passage 46.

The electric pump 24 includes an electric motor 25 and a pump 26. The electric pump 25 serves as the power source for the electric pump 24. The pump 26 is driven by the electric motor 25. A brushless motor having three-phase coils is used as the electric motor 25.

The solenoid valve 70 is configured as a bypass valve that changes the state of communication among the third oil passage 43, the fifth oil passage 45, the fourth oil passage 44 and the sixth oil passage 46. That is, the operation state of the solenoid valve 70 is controlled to change the state of communication between the first hydraulic chamber 21A and the second hydraulic chamber 21B, between the state where flow of hydraulic oil between the first hydraulic chamber 21A and the second hydraulic chamber 21B is interrupted and the hydraulic chambers 21A and 21B are in communication with the flow-rate control valve 30, and the state where the first hydraulic chamber 21A and the second hydraulic chamber 21B are communicated with each other.

Figure 2:
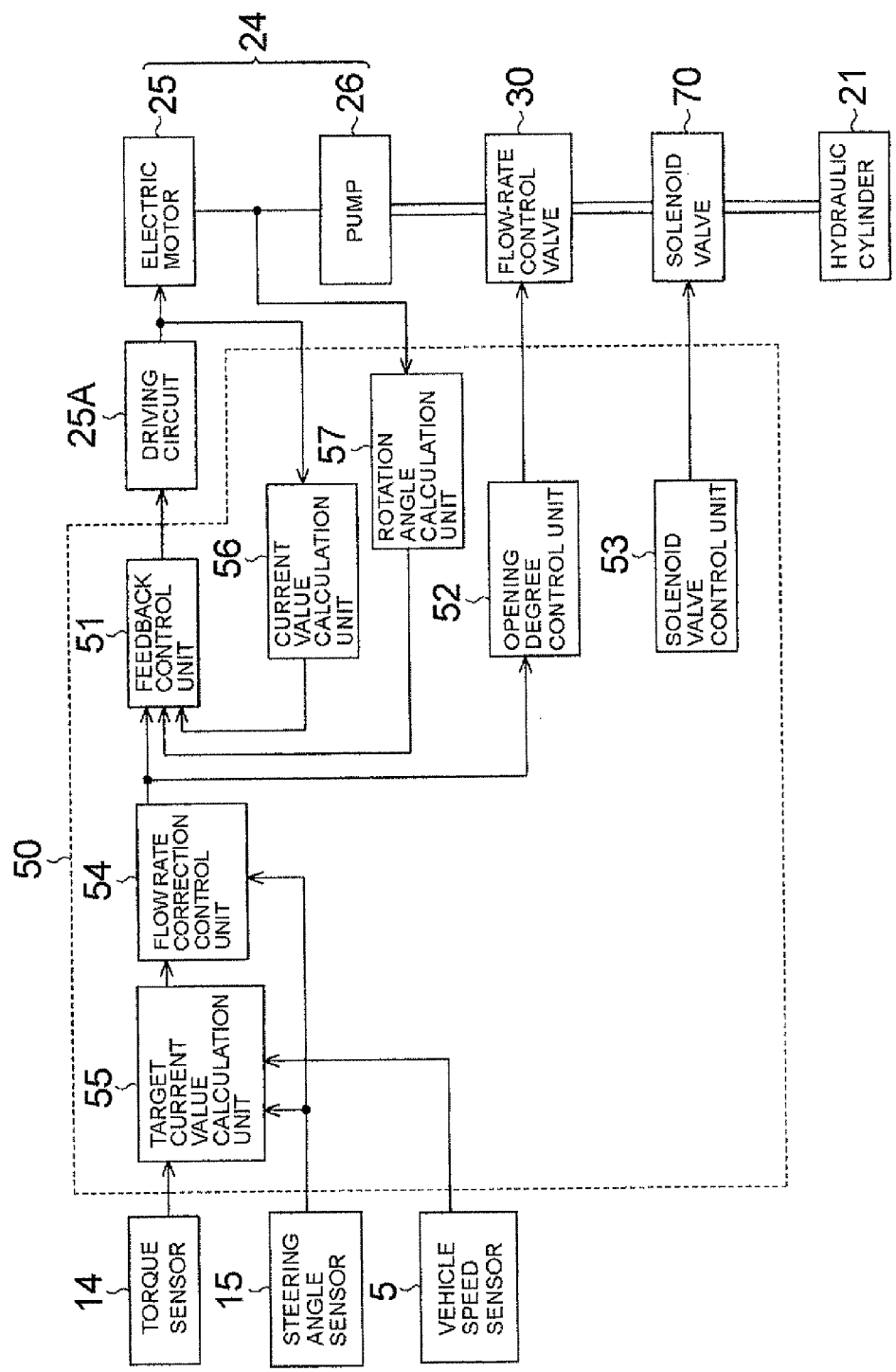
FIG. 2 is a block diagram that shows the configuration of a control device of the hydraulic power steering system.

The configuration of control over the hydraulic power steering system 1 will be described with reference to FIG. 2. The control device 50 includes a feedback control unit 51, an opening degree control unit 52, a solenoid valve control unit 53 and a flow rate correction control unit 54. The feedback control unit 51 executes feedback control over the electric motor 25. The opening degree control unit 52 controls the opening degree of the flow-rate control valve 30. The solenoid valve control unit 53 controls the solenoid valve 70. The flow rate correction control unit 54 corrects the flow rate of hydraulic oil.

The control device 50 includes, in addition to the above-described units, a target current value calculation unit 55, a current value calculation unit 56 and a rotation angle calculation unit 57. The target current value calculation unit 55 calculates a target value of current that is supplied to the electric motor 25. The current value calculation unit 56 detects a value of current supplied to the electric motor 25. The rotation angle calculation unit 57 detects the rotation angle of the electric motor 25. Note that the control units 51 to 54 and the calculation units 55 to 57 are formed of an electronic circuit, such as an integrated circuit, that executes computation processing.

The control device 50 executes assist control for assisting the driver in operating the steering wheel 2. That is, the control device 50 executes control for adjusting the magnitude of hydraulic pressure that is applied to the steered shaft 13 by the assist device 20, on the basis of the running state of the vehicle, the operating state of the steering wheel 2, the operation state of the hydraulic power steering system 1, and the like.

The assist control includes control over the discharge rate of the electric pump 24 (hereinafter, referred to as "Control A"), control over the state of communication among the oil passages provided by the flow-rate control valve 30 (hereinafter, referred to as "Control B"), and control over the state of communication between the hydraulic chambers of the hydraulic cylinder 21 provided by the solenoid valve 70 (hereinafter, referred to as "Control C").

Control A will be described below. The target current value calculation unit 55 calculates the target current value for the current that is supplied to the electric motor 25, on the basis of a signal output from the torque sensor 14, a signal output from the steering angle sensor 15 and a signal output from the vehicle speed sensor 5.

When the flow rate correction control unit 54 determines, on the basis of the signal output from the steering angle sensor 15, that the flow rate of hydraulic oil needs to be increased or reduced, the flow rate correction control unit 54 corrects the target current value for the electric motor 25 on the basis of the signal output from the steering angle sensor 15.

The current value calculation unit 56 calculates the value of current supplied to the electric motor 25 on the basis of a current output from a driving circuit 25A of the electric motor 25. The rotation angle calculation unit 57 calculates the rotation angle of the electric motor 25 on the basis of the value of current supplied to the electric motor 25.

The feedback control unit 51 executes feedback control over the electric motor 25 via the driving circuit 25A on the basis of the target current value for the electric motor 25, received from the target current value calculation unit 55 via the flow rate correction control unit 54, the value of current supplied to the electric motor 25, received from the current value calculation unit 56, and the rotation angle of the electric motor 25, received from the rotation angle calculation unit 57. Note that the driving circuit 25A is formed of a PWM driving circuit that includes switching elements.

Control B will be described below. The opening degree control unit 52 controls the opening degree of the flow-rate control valve 30 on the basis of the target current value for the electric motor 25, received from the target current value calculation unit 55 via the flow rate correction control unit 54. Control over the flow-rate control valve 30, as well as control over the electric motor 25, is executed via a driving circuit (not shown) formed of a PWM driving circuit that includes switching elements.

The flow rate of hydraulic oil that is supplied to the hydraulic cylinder 21 is determined based on the rotation speed of the electric pump 24 (the rotation speed of the electric motor 25) and the opening degree of the flow-rate control valve 30. Therefore, the flow-rate control valve 30 is controlled in coordination with the electric motor 25 on the basis of the target current value for the electric motor 25.

Control C will be described below. The solenoid valve control unit 53 controls the solenoid valve 70 on the basis of a request to the assist device 20, which is set on the basis of the operating mode of the steering wheel 2 shown in FIG. 1, thereby changing the state of communication between the first hydraulic chamber 21A and the second hydraulic chamber 21B. Control over the solenoid valve 70 is executed via a driving circuit (not shown) formed of a solenoid driving circuit.

Figure 3:
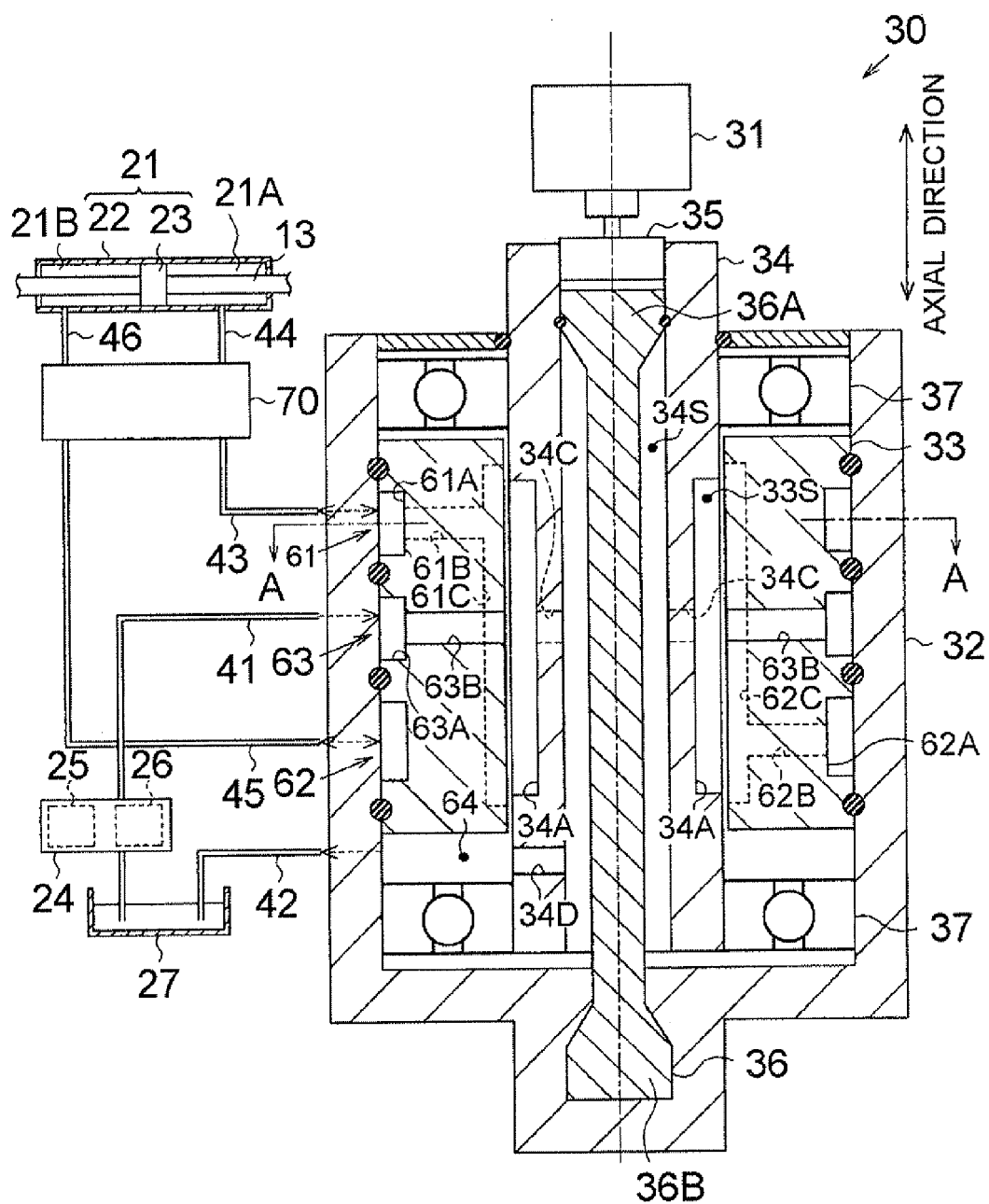
FIG. 3 is a schematic view that schematically shows the sectional structure of a flow-rate control valve of the hydraulic power steering system and the structure of its surroundings.

The detailed structure of the assist device 20 will be described with reference to FIG. 3 to FIG. 5B. As shown in FIG. 3, the flow-rate control valve 30 includes a housing 32, a communication member 33, a valve element 34 and a torsion bar 36. The first oil passage 41, the second oil passage 42, the third oil passage 43 and the fifth oil passage 45 are connected to the housing 32. The communication member 33 has a plurality of ports that are in communication with the oil passages via the housing 32. The valve element 34 rotates with respect to the communication member 33. The torsion bar 36 rotates together with the valve element 34.

The flow-rate control valve 30 includes, in addition to the above-described components, an electric motor 31, a fixing member 35 and two bearings 37. The electric motor 31 is used to rotate the valve element 34. The fixing member 35 is used to fix the output shaft of the electric motor 31 to the valve element 34. The valve element 34 is supported by the housing 32 via the two bearings 37.

The housing 32, the communication member 33, the valve element 34 and the torsion bar 36 each are formed as a cylindrical member. The torsion bar 36 is arranged in a space formed inside the valve element 34 (hereinafter, "internal space 34S"). The valve element 34 is arranged in a space formed inside the communication member 33 (hereinafter, "internal space 33S"). The communication member 33 is arranged in a space formed inside the housing 32. In addition, the housing 32, the communication member 33, the valve element 34 and the torsion bar 36 are provided coaxially.

The structure for transmitting rotation in the flow-rate control valve 30 will be described. The output shaft of the electric motor 31 is fixed to the fixing member 35. The fixing member 35 is fixed to the valve element 34. A first end portion 36A of the torsion bar 36 is fixed to the valve element 34. A second end portion 36B of the torsion bar 36 is fixed to the housing 32. The valve element 34 is supported by the housing 32 via the two bearings 37.

Because the components are assembled together in this way, when the electric motor 31 rotates, the output shaft of the electric motor 31, the fixing member 35, the valve element 34 and a portion of the torsion bar 36, which includes the first end portion 36A, rotate together with each other with respect to the housing 32 and the communication member 33. In the torsion bar 36, the portion that includes the first end portion 36A is twisted with respect to a portion that includes the second end portion 36B.

In a state where the torsion bar 36 is twisted, when torque applied from the electric motor 31 to the torsion bar 36 is smaller than the restoring force of the torsion bar 36, the portion of the torsion bar 36, which includes the first end portion 36A, rotates with respect to the portion of the torsion bar 36, which includes the second end portion 36B, in such a direction that the amount of twist is reduced. As described above, the output shaft of the electric motor 31, the fixing member 35, the valve element 34, and the portion of the torsion bar 36, which includes the first end portion 36A, rotate together with each other with respect to the housing 32 and the communication member 33.

The structure of the communication member 33 and valve element 34 will be described. The communication member 33 has four ports, that is, the first port 61, the second port 62, the supply port 63 and the drain port 64. The third oil passage 43 is in communication with the first port 61. The fifth oil passage 45 is in communication with the second port 62. The first oil passage 41 is in communication with the supply port 63. The second oil passage 42 is in communication with the drain port 64.

The discharge port of the electric pump 24 is in communication with the supply port 63 via the first oil passage 41. The first hydraulic chamber 21A is in communication with the first port 61 via the third oil passage 43 and the solenoid valve 70. The second hydraulic chamber 21B is in communication with the second port 62 via the fifth oil passage 45 and the solenoid valve 70. The reservoir tank 27 is in communication with the drain port 64 via the second oil passage 42.

The supply port 63 is formed of a supply annular groove 63A and supply communication holes 63B. The supply annular groove 63A is formed in the outer peripheral portion of the communication member 33. The supply communication holes 63B provide communication between the supply annular groove 63A and the internal space 33S of the communication member 33. The first oil passage 41 is in communication with the supply annular groove 63A.

Figure 4:
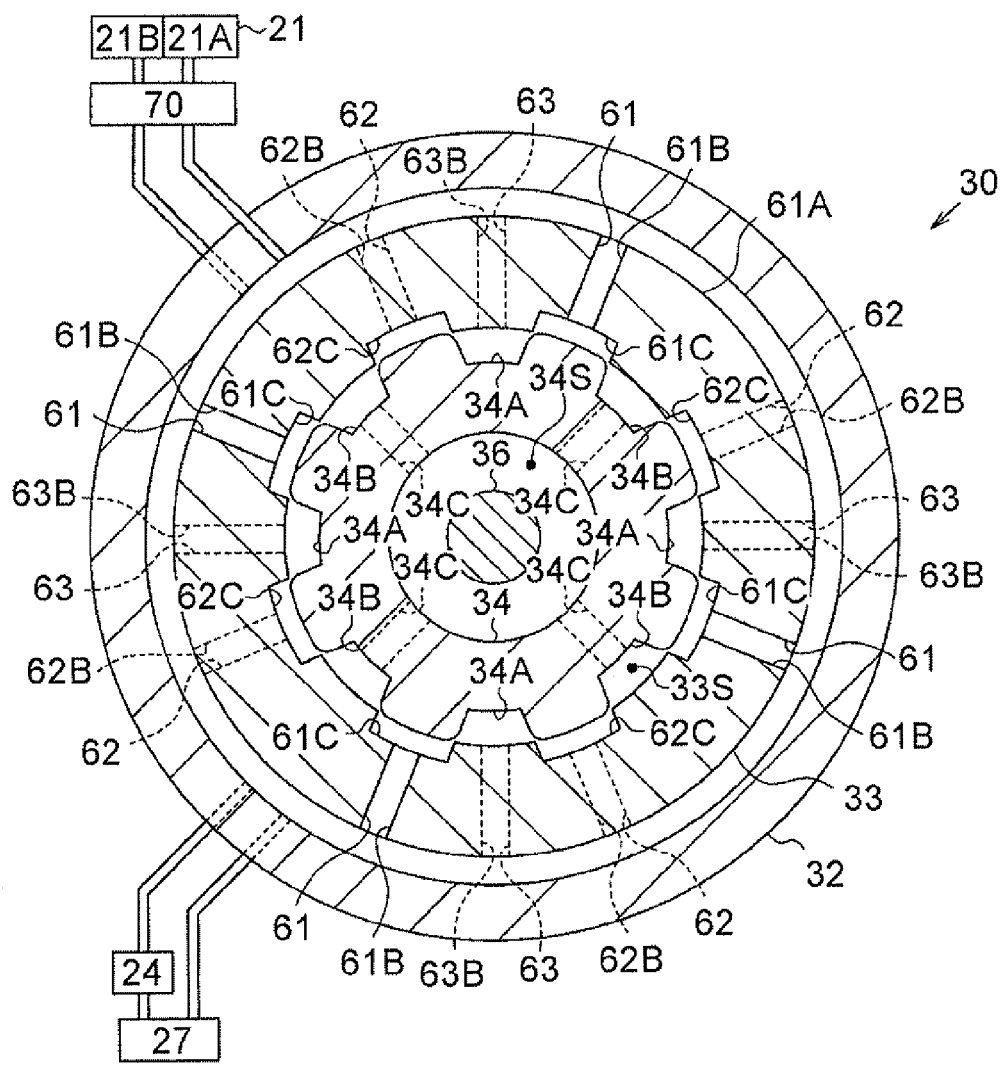
FIG. 4 is a sectional view that shows the sectional structure of the flow-rate control valve, taken along the line A-A in FIG. 3, in a state where the rotational position of a valve element coincides with the rotation neutral position.

The first port 61 is formed of a first annular groove 61A, first longitudinal axial grooves 61C and first communication holes 61B. The first annular groove 61A is formed in the outer peripheral surface of the communication member 33. The first longitudinal axial grooves 61C are formed in the inner peripheral surface of the communication member 33, and extend in the axial direction. The first communication holes 61B provide communication between the first annular groove 61A and the first longitudinal axial grooves 61C. The third oil passage 43 is in communication with the first annular groove 61A. As shown in FIG. 4, four first longitudinal axial grooves 61C are formed in the inner peripheral surface of the communication member 33. The first longitudinal axial grooves 61C are formed at equal intervals in the circumferential direction.

The second port 62 is formed of a second annular groove 62A, second longitudinal axial grooves 62C and second communication holes 62B. The second annular groove 62A is formed in the outer peripheral surface of the communication member 33. The second longitudinal axial grooves 62C are formed in the inner peripheral surface of the communication member 33, and extend in the axial direction. The second communication holes 62B provide communication between the second annular groove 62A and the second longitudinal axial grooves 62C. The fifth oil passage 45 is in communication with the second annular groove 62A. As shown in FIG. 4, four second longitudinal axial grooves 62C are formed in the inner peripheral surface of the communication member 33. The second longitudinal axial grooves 62C are formed at equal intervals in the circumferential direction.

The first annular groove 61A, the second annular groove 62A and the supply annular groove 63A are formed at different positions in the axial direction of the communication member 33. In addition, the first communication holes 61B, the second communication holes 62B and the supply communication holes 63B are formed at different positions in the axial direction of the communication member 33.

The valve element 34 has supply valve element grooves 34A, drain valve element grooves 34B, inlet communication holes 34C and an outlet communication hole 34D. The supply valve element grooves 34A and the drain valve element grooves 34B are in communication with the first longitudinal axial grooves 61C or the second longitudinal axial grooves 62C depending on the rotational position of the valve element 34 with respect to the communication member 33. The inlet communication holes 34C provide communication between the drain valve element grooves 34B and the internal space 34S. The outlet communication hole 34D provides communication between the drain port 64 and the internal space 34S.

The structure of the solenoid valve 70 will be described with reference to FIG. 3. The solenoid valve 70 is in communication with the first port 61 of the flow-rate control valve 30 via the third oil passage 43. In addition, the solenoid valve 70 is in communication with the second port 62 of the flow-rate control valve 30 via the fifth oil passage 45.

A partitioning mode and a communication mode are set as the operation mode of the solenoid valve 70. When the assist device 20 is required to assist the driver in operating the steering wheel 2, the partitioning mode is selected. On the other hand, when it is difficult to provide assistance by the assist device 20, the communication mode is selected.

In the partitioning mode, communication is provided between the third oil passage 43 and the fourth oil passage 44, and communication is provided between the fifth oil passage 45 and the sixth oil passage 46. That is, communication is provided between the first port 61 and the first hydraulic chamber 21A, and communication is provided between the second port 62 and the second hydraulic chamber 21B.

In the communication mode, communication is provided between the fourth oil passage 44 and the sixth oil passage 46. That is, interrupted communication between the third oil passage 43 and fourth oil passage 44, and the fifth oil passage 45 and sixth oil passage 46 is cancelled by the solenoid valve 70 to provide communication between the first hydraulic chamber 21A and the second hydraulic chamber 21B.

The relationship between the communication member 33 and the valve element 34 will be described with reference to FIG. 4, FIG. 5A and FIG. 5B. In the flow-rate control valve 30, the relationship between the first oil passage 41 and second oil passage 42, and the third oil passage 43 and fifth oil passage 45 is changed on the basis of the rotational position of the valve element 34 with respect to the communication member 33.

As shown in FIG. 4, when the rotational position of the valve element 34 coincides with "rotation neutral position", the supply port 63 and the drain port 64 are in communication with the first port 61 and the second port 62 via the gaps between the communication member 33 and the valve element 34.

Figure 5A:
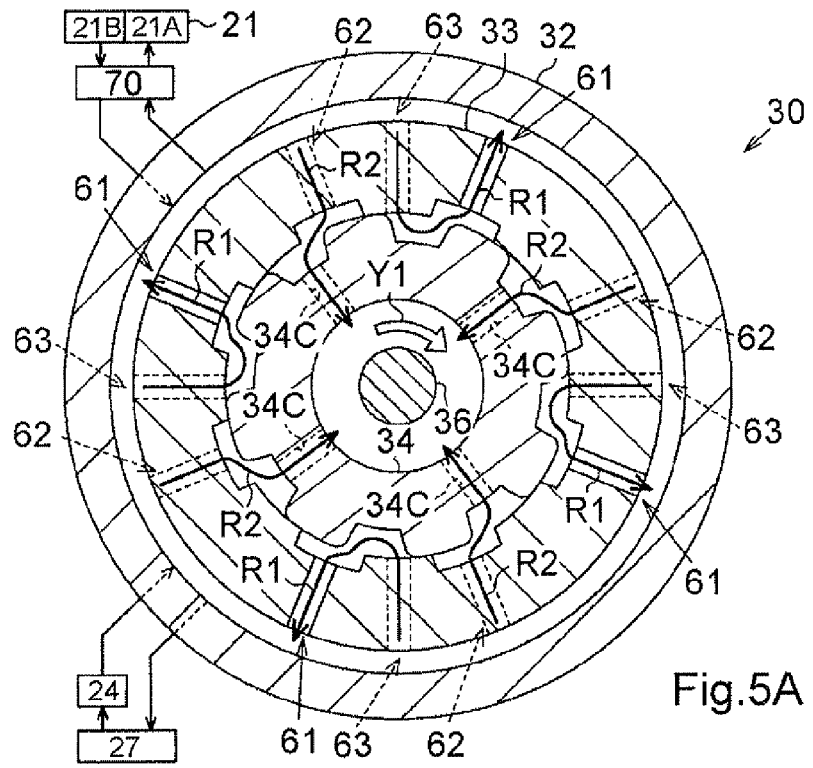
FIG. 5A is a sectional view that shows the sectional structure of the flow-rate control valve, taken along the line A-A in FIG. 3, in a state where the rotational position of the valve element coincides with a first supply position.

As shown in FIG. 5A, when the rotational position of the valve element 34 coincides with "first supply position", the supply port 63 is in communication with the first port 61, and the drain port 64 is in communication with the second port 62.

Figure 5B:
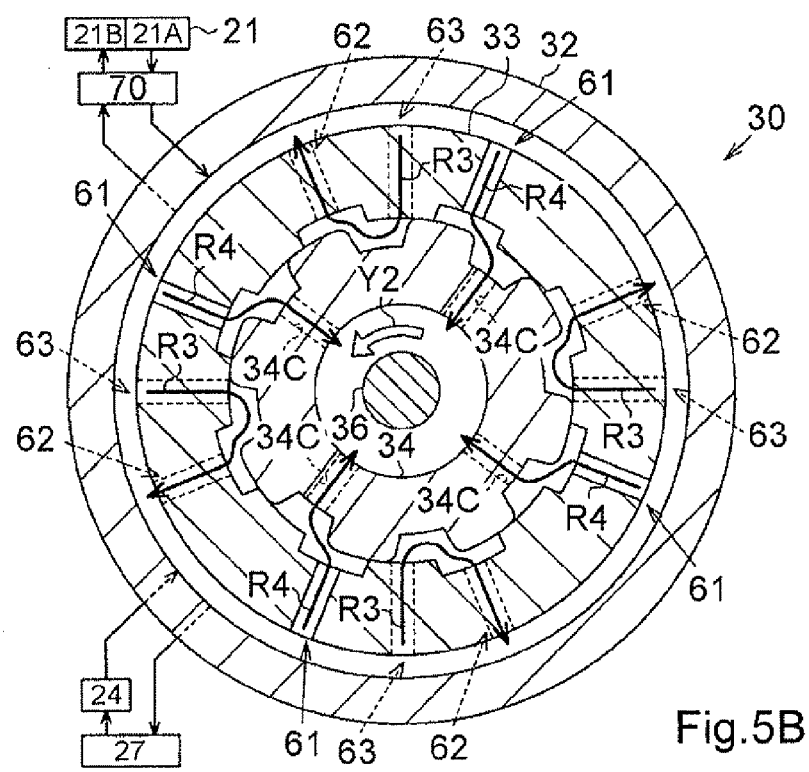
FIG. 5B is a sectional view that shows the sectional structure of the flow-rate control valve, taken along the line A-A in FIG. 3, in a state where the rotational position of the valve element coincides with a second supply position.

As shown in FIG. 5B, when the rotational position of the valve element 34 coincides with "second supply position", the supply port 63 is in communication with the second port 62, and the drain port 64 is in communication with the first port 61.

Here, the following operation modes of the flow-rate control valve 30 are defined.
(A) The mode in which the valve element 34 is set at the rotation neutral position is defined as "neutral mode".
(B) The mode in which the valve element 34 is set at the first supply position is defined as "first mode".
(C) The mode in which the valve element 34 is set at the second supply position is defined as "second mode".

The control mode in which the flow-rate control valve 30 is controlled by the control device 50 will be described. The control device 50 selects the operation mode of the flow-rate control valve 30 on the basis of the operating state of the steering wheel 2. That is, when the steering wheel 2 is not operated, the neutral mode is selected as the operation mode of the flow-rate control valve 30. When the steering wheel 2 is rotated clockwise, the first mode is selected as the operation mode of the flow-rate control valve 30. On the other hand, when the steering wheel 2 is rotated counterclockwise, the second mode is selected as the operation mode of the flow-rate control valve 30.

When the rotational position of the valve element 34 is different from the rotational position corresponding to the selected operation mode, for example, when the rotational position of the valve element 34 coincides with the rotation neutral position in a state where the first mode is selected, the value of current supplied to the electric motor 31 is changed such that the rotational position of the valve element 34 coincides with the rotational position corresponding to the operation mode.

The flow of hydraulic oil in the flow-rate control valve 30 will be described with reference to FIG. 4 to FIG. 5B. Note that the following description on the flow of hydraulic oil will be provided on the precondition that the operation mode of the solenoid valve 70 is set to the partitioning mode.

The flow of hydraulic oil in the (A) neutral mode will be described below. As shown in FIG. 4, when the operation mode is changed from the first mode or second mode to the neutral mode, the rotational position of the valve element 34 is changed from the first supply position or second supply position to the rotation neutral position. Thus, the first port 61 and the second port 62 are respectively connected to the supply port 63 and the internal space 33S (drain port 64) via the gaps.

At this time, a small amount of hydraulic oil is supplied from the supply port 63 to the first port 61 and the second port 62, and a small amount of hydraulic oil is drained from the first port 61 and the second port 62 to the internal space 33S (drain port 64). Therefore, the hydraulic pressure in each of the first hydraulic chamber 21A and second hydraulic chamber 21B of the hydraulic cylinder 21 is kept at a substantially constant pressure.

The flow of hydraulic oil in the (B) first mode will be described below. As shown in FIG. 5A, when the operation mode is changed from the neutral mode to the first mode, the valve element 34 rotates in the direction indicated by the arrow Y1, so the rotational position of the valve element 34 is changed from the rotation neutral position to the first supply position. Thus, the supply port 63 and the first port 61 are in communication with each other, and the drain port 64 and the second port 62 are in communication with each other.

Hydraulic oil discharged from the electric pump 24 is supplied to the first hydraulic chamber 21A of the hydraulic cylinder 21 via the first oil passage 41, the supply port 63, the first port 61, the third oil passage 43, the solenoid valve 70 and the fourth oil passage 44. In addition, as indicated by the arrow R1 in FIG. 5A, in the flow-rate control valve 30, hydraulic oil flows through the supply communication holes 63B, the supply valve element grooves 34A, the first longitudinal axial grooves 61C, the first communication holes 6B and the first annular groove 61A in this order.

Hydraulic oil in the second hydraulic chamber 21B of the hydraulic cylinder 21 is returned to the reservoir tank 27 via the sixth oil passage 46, the solenoid valve 70, the fifth oil passage 45, the second port 62, the internal space 34S, the drain port 64 and the second oil passage 42. In addition, as indicated by the arrow R2 in FIG. 5A, in the flow-rate control valve 30, hydraulic oil flows through the second annular groove 62A, the second communication holes 62B, the second longitudinal axial grooves 62C, the drain valve element grooves 34B, the inlet communication holes 34C and the internal space 34S in this order.

The flow of hydraulic oil in the (C) second mode will be described below. As shown in FIG. 5B, when the operation mode is changed from the neutral mode to the second mode, the valve element 34 rotates in the direction indicated by the arrow Y2, so the rotational position of the valve element 34 is changed from the rotation neutral position to the second supply position. Thus, the supply port 63 is in communication with the second port 62, and the drain port 64 is in communication with the first port 61.

Hydraulic oil discharged from the electric pump 24 is supplied to the second hydraulic chamber 21B of the hydraulic cylinder 21 via the first oil passage 41, the supply port 63, the second port 62, the fifth oil passage 45, the solenoid valve 70 and the sixth oil passage 46. In addition, as indicated by the arrow R3 in FIG. 5B, in the flow-rate control valve 30, hydraulic oil flows through the supply communication holes 63B, the supply valve element grooves 34A, the second longitudinal axial grooves 62C, the second communication holes 62B and the second annular groove 62A in this order.

Hydraulic oil in the first hydraulic chamber 21A of the hydraulic cylinder 21 is returned to the reservoir tank 27 via the fourth oil passage 44, the solenoid valve 70, the third oil passage 43, the first port 61, the internal space 34S, the drain port 64 and the second oil passage 42. In addition, as indicated by the arrow R4 in FIG. 5B, in the flow-rate control valve 30, hydraulic oil flows through the first annular groove 61A, the first communication holes 61B, the first longitudinal axial grooves 61C, the drain valve element grooves 34B, the inlet communication holes 34C and the internal space 34S in this order.

Adjustment of the amount of hydraulic oil supplied to the hydraulic cylinder 21 will be described with reference to FIG. 2. The control device 50 controls the rotation speed of the electric pump 24 (that is, the rotation speed of the electric motor 25) and the opening degree of the flow-rate control valve 30 to thereby adjust the amount of hydraulic oil supplied to the first hydraulic chamber 21A and second hydraulic chamber 21B of the hydraulic cylinder 21. The amount of hydraulic oil supplied increases as the rotation speed of the electric pump 24 increases. In addition, the amount of hydraulic oil supplied increases as the opening degree of the flow-rate control valve 30 increases.

The opening degree of the flow-rate control valve 30 will be described in detail. Examples of the opening degree of the flow-rate control valve 30 include the following four opening degrees.

(a) First supply opening degree for changing the amount of hydraulic oil supplied to the first hydraulic chamber 21A.
(b) Second supply opening degree for changing the amount of hydraulic oil supplied to the second hydraulic chamber 21B.
(c) First drain opening degree for changing the amount of hydraulic oil drained from the first hydraulic chamber 21A.
(d) Second drain opening degree for changing the amount of hydraulic oil drained from the second hydraulic chamber 21B.

Specifically, the above described opening degrees correspond to the following portions of the flow-rate control valve 30. The first supply opening degree corresponds to the area of the passages that provide communication between the first longitudinal axial grooves 61C of the first port 61 and the supply valve element grooves 34A. The second supply opening degree corresponds to the area of the passages that provide communication between the second longitudinal axial grooves 62C of the second port 62 and the supply valve element grooves 34A. The first drain opening degree corresponds to the area of the passages that provide communication between the first longitudinal axial grooves 61C of the first port 61 and the drain valve element grooves 34B. The second drain opening degree corresponds to the area of the passages that provide communication between the second longitudinal axial grooves 62C of the second port 62 and the drain valve element grooves 34B.

The detailed structure of the solenoid valve 70 will be described with reference to FIG. 6. The solenoid valve 70 includes a housing 71, a spool 74, a solenoid 75 and a coil spring 76. The third oil passage 43, the fourth oil passage 44, the fifth oil passage 45 and the sixth oil passage 46 are connected to the housing 71. The spool 74 moves in the axial direction with respect to the housing 71. The solenoid 75 moves the spool 74 using electromagnetic force. The coil spring 76 moves the spool 74 using restoring force.

The spool 74 and the coil spring 76 are arranged in the internal space 72 formed inside the housing 71.

The structure of the housing 71 and spool 74 will be described. The housing 71 has four ports, that is, a first port 71A, a second port 71B, a third port 71C and a fourth port 71D. The third oil passage 43 is in communication with the first port 71A. The fourth oil passage 44 is in communication with the second port 71B. The fifth oil passage 45 is in communication with the third port 71C. The sixth oil passage 46 is in communication with the fourth port 71D. In addition, an annular groove 73 is formed in the inner peripheral surface of the housing 71.

The first hydraulic chamber 21A is in communication with the second port 71B via the fourth oil passage 44. The second hydraulic chamber 21B is in communication with the fourth port 71D via the sixth oil passage 46.

The first port 61 of the flow-rate control valve 30 is in communication with the first port 71A via the third oil passage 43. The second port 62 of the flow-rate control valve 30 is in communication with the third port 71C via the fifth oil passage 45.

The internal space 72 is divided into a first space 72A, a second space 72B and a groove space 72C. The first space 72A is a space located closer to a second valve element 74B than an edge of the annular groove 73, the edge being on the second valve element 74B-side. The second space 72B is a space located closer to a third valve element 74C than an edge of the annular groove 73, the edge being on the third valve element 74C-side. The groove space 72C corresponds to the annular groove 73.

The spool 74 includes a first valve element 74A, the second valve element 74B, the third valve element 74C and a coupling shaft 74D. The first valve element 74A changes the relationship between the second port 71B and fourth port 71D, and the groove space 72C on the basis of its axial position. The coil spring 76 is attached to the second valve element 74B. The third valve element 74C is brought into contact with the wall surface of the housing 71 on the basis of its axial position. The coupling shaft 74D couples the valve elements 74A to 74C to one another. A movable core that is moved by the magnetic force of the solenoid 75 is used as the second valve element 74B.

The operation of the spool 74 will be described with reference to FIG. 6 and FIG. 7. In the solenoid valve 70, the relationship among the third oil passage 43, the fourth oil passage 44, the fifth oil passage 45 and the sixth oil passage 46 is changed as follows on the basis of the axial position of the spool 74 with respect to the housing 71 (hereinafter, "spool position S").

Figure 6:
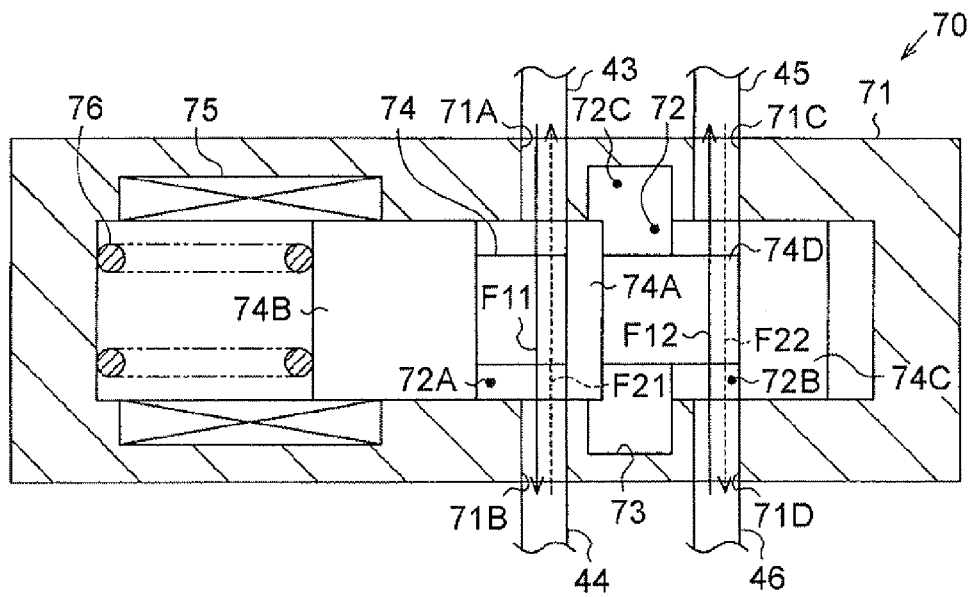
FIG. 6 is a sectional view that shows the sectional structure of a solenoid valve in a state where a spool is placed within a partitioning range.

As shown in FIG. 6, when the spool position S is in the "partitioning range", communication is provided between the third oil passage 43 and the fourth oil passage 44 via the first space 72A. In addition, communication is provided between the fifth oil passage 45 and the sixth oil passage 46 via the second space 72B. In addition, flow of hydraulic oil between the first space 72A and the groove space 72C is interrupted by the first valve element 74A. That is, flow of hydraulic oil between the first space 72A and the second space 72B is interrupted.

Figure 7:
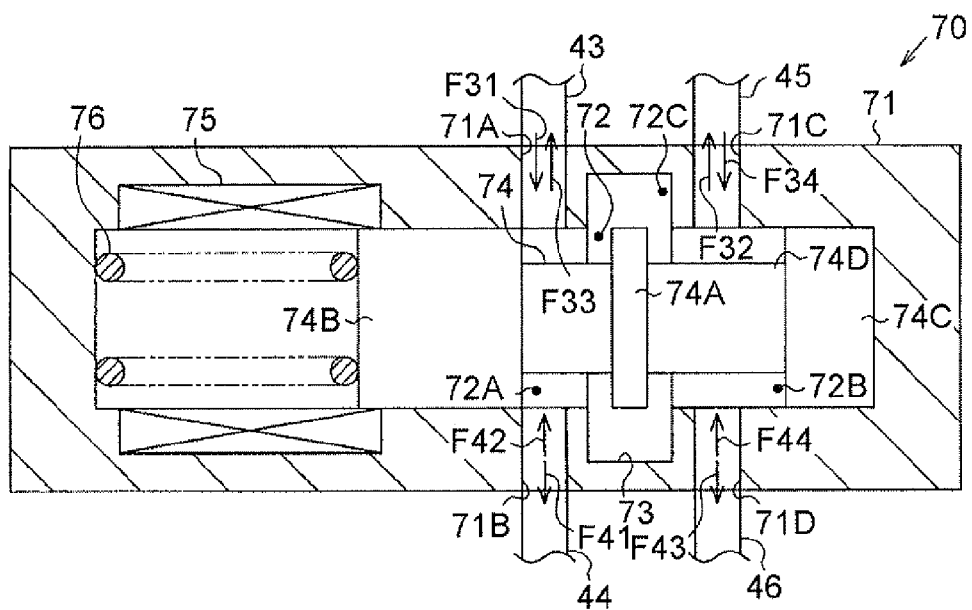
FIG. 7 is a sectional view that shows the sectional structure of the solenoid valve in a state where the spool is placed within a communication range.

As shown in FIG. 7, when the spool position S is in the "communication range", communication is provided between the fourth oil passage 44 and the groove space 72C via the first space 72A. In addition, communication is provided between the sixth oil passage 46 and the groove space 72C via the second space 72B. That is, communication is provided between the fourth oil passage 44 and the sixth oil passage 46 via the internal space 72.

Here, the following two positions are defined as the spool position S.
(A) The spool position S shown in FIG. 6, that is, the position at which the spool 74 has been moved to the maximum toward the coil spring 76 within the partitioning range, is defined as "maximum partitioning position SB".
(B) The spool position S shown in FIG. 7, that is, the position at which the spool 74 has been moved to the maximum toward the opposite side from the coil spring 76-side within the communication range, is defined as "maximum communication position SA".

In addition, the following two modes are defined as the operation mode of the solenoid valve 70.
(A) The mode in which the spool position S is set to be within the partitioning range is defined as "partitioning mode".
(B) The mode in which the spool position S is set to be within the communication range is defined as "communication mode".

The control mode in which the solenoid valve 70 is controlled by the control device 50 will be described. The control device 50 selects the operation mode of the solenoid valve 70 on the basis of the operating state of the steering wheel 2. That is, when the steering wheel 2 is not operated, the communication mode is selected as the operation mode of the solenoid valve 70. In addition, when the steering wheel 2 is rotated clockwise or counterclockwise, the partitioning mode is selected as the operation mode of the solenoid valve 70.

Then, direct driving current is supplied as follows on the basis of the selected operation mode. That is, when the partitioning mode is selected, a driving current A having a predetermined magnitude (hereinafter, "maximum current AX") is supplied to the solenoid 75. On the other hand, when the communication mode is selected, no driving current A is supplied to the solenoid 75.

The maximum current AX is set in advance as the driving current A for moving the spool 74 from the maximum communication position SA shown in FIG. 7 to the maximum partitioning position SB shown in FIG. 6. Therefore, when resistance that acts on the spool 74 falls within a range of magnitudes expected in advance, as the maximum current AX is supplied to the solenoid 75, the spool 74 is maintained in the maximum partitioning position SB.

The flow of hydraulic oil in the solenoid valve 70 will be described with reference to FIG. 6 and FIG. 7. Note that the solid arrows F11 and F12 in FIG. 6 indicate the flow of hydraulic oil when the flow-rate control valve 30 is set in the first mode, and the broken arrows F21 and F22 in FIG. 6 indicate the flow of hydraulic oil when the flow-rate control valve 30 is set in the second mode.

The flow of hydraulic oil in the (A) partitioning mode will be described below. As shown in FIG. 6, when the operation mode is changed from the communication mode to the partitioning mode, the spool position S is shifted from the communication range to the partitioning range. Thus, communication is provided between the first port 71A and the second port 71B via the first space 72A. In addition, communication is provided between the third port 71C and the fourth port 71D via the second space 72B.

In a state where the operation mode of the solenoid valve 70 is set to the partitioning mode, when the operation mode of the flow-rate control valve 30 shown in FIG. 3 is set to the first mode, that is, the mode in which hydraulic oil is supplied to the first port 61 and hydraulic oil is drained from the second port 62 is selected, hydraulic oil flows via the solenoid valve 70 as follows.

That is, as indicated by the arrow F11, hydraulic oil in the third oil passage 43 flows through the first port 71A, the first space 72A, the second port 71B and the fourth oil passage 44 in this order, and is supplied to the first hydraulic chamber 21A. In addition, as indicated by the arrow F12, hydraulic oil in the second hydraulic chamber 21B flows through the sixth oil passage 46, the fourth port 71D, the second space 72B, the third port 71C and the fifth oil passage 45 in this order, and is drained to the reservoir tank 27 via the flow-rate control valve 30.

In a state where the operation mode of the solenoid valve 70 is set in the partitioning mode, when the operation mode of the flow-rate control valve 30 shown in FIG. 3 is set to the second mode, that is, the mode in which hydraulic oil is supplied to the second port 62 and hydraulic oil is drained from the first port 61 is selected, hydraulic oil flows via the solenoid valve 70 as follows.

That is, as indicated by the arrow F21, hydraulic oil in the first hydraulic chamber 21A flows through the fourth oil passage 44, the second port 71B, the first space 72A, the first port 71A and the third oil passage 43 in this order, and is drained to the reservoir tank 27 via the flow-rate control valve 30. In addition, as indicated by the arrow F22, hydraulic oil in the fifth oil passage 45 flows through the third port 71C, the second space 72B, the fourth port 71D and the sixth oil passage 46 in this order, and is supplied to the second hydraulic chamber 21B.

The flow of hydraulic oil in the (B) communication mode will be described below. As shown in FIG. 7, when the operation mode is changed from the partitioning mode to the communication mode, the spool position S is shifted from the partitioning range to the communication range. Thus, communication is provided between the second port 71B and the groove space 72C via the first space 72A. In addition, communication is provided between the fourth port 71D and the groove space 72C via the second space 72B. That is, communication is provided between the second port 71B and the fourth port 71D via the internal space 72.

In a state where the operation mode of the solenoid valve 70 is set to the communication mode, when the operation mode of the flow-rate control valve 30 shown in FIG. 3 is set to the first mode, hydraulic oil flows via the solenoid valve 70 as follows.

That is, as indicated by the arrow F31, hydraulic oil in the third oil passage 43 is supplied to the first space 72A via the first port 71A. In addition, as indicated by the arrow F32, hydraulic oil in the second space 72B is drained from the third port 71C to the flow-rate control valve 30.

In a state where the operation mode of the solenoid valve 70 is set to the communication mode, when the operation mode of the flow-rate control valve 30 shown in FIG. 3 is set to the second mode, hydraulic oil flows via the solenoid valve 70 as follows.

That is, as indicated by the arrow F33, hydraulic oil in the first space 72A is drained from the first port 71A to the flow-rate control valve 30. In addition, as indicated by the arrow F34, hydraulic oil in the fifth oil passage 45 is supplied to the second space 72B via the third port 71C.

In addition, as indicated by the arrow F41, when the pressure in the internal space 72 is higher than the pressure in the first hydraulic chamber 21A, hydraulic oil in the first space 72A is supplied to the first hydraulic chamber 21A via the second port 71B. In addition, as indicated by the arrow F42, when the pressure in the internal space 72 is lower than the pressure in the first hydraulic chamber 21A, hydraulic oil in the first hydraulic chamber 21A is drained to the first space 72A via the second port 71B.

In addition, as indicated by the arrow F43, when the pressure in the internal space 72 is higher than the pressure in the second hydraulic chamber 21B, hydraulic oil in the second space 72B is supplied to the second hydraulic chamber 21B via the fourth port 71D. In addition, as indicated by the arrow F44, when the pressure in the internal space 72 is lower than the pressure in the second hydraulic chamber 21B, hydraulic oil in the second hydraulic chamber 21B is drained to the second space 72B via the fourth port 71D.

Control over the solenoid valve 70 will be described with reference to FIG. 8 to FIG. 11. In the solenoid valve 70, contaminations may clog between the housing 71 and the spool 74, resulting in interference with the operation of the spool 74. Hereinafter, the state where contaminations interfere with the operation of the spool 74 is defined as "abnormal valve state", and the state where the spool 74 operates without being interfered by the contaminations is defined as "normal valve state".

In the abnormal valve state, the relationship between the driving current A, supplied to the solenoid 75, and the spool position S is different from the relationship in the normal valve state. Therefore, where a control device that detects the spool position S on the basis of only the driving current A supplied to the solenoid 75 is "virtual control device", the following problem occurs in the virtual control device.

That is, in the abnormal valve state, when the maximum current AX is supplied to the solenoid 75, the spool 74 is held in a state where the spool 74 is placed at a position different from the maximum partitioning position SB. On the other hand, in the virtual control device, on the basis of the assumption that the maximum current AX is supplied, it is determined that the spool 74 is placed at the maximum partitioning position SB.

In this way, when the solenoid valve 70 is in the abnormal valve state, the spool position S recognized in the virtual control device is different from the actual spool position S. Therefore, there is a possibility that the assist device 20 will not appropriately assist the driver in operating the steering wheel 2.

Here, as an example of the abnormal valve state, there is assumed a situation that, in the case where the driving current A for shifting the spool position S from the communication range to the partitioning range is supplied to the solenoid 75, movement of the spool 74 is stopped due to contaminations before the spool 74 reaches the partitioning range.

At this time, the spool position S is within the communication range, so the hydraulic pressure in the first hydraulic chamber 21A is equal to the hydraulic pressure in the second hydraulic chamber 21B. That is, it is impossible for the assist device 20 to assist the driver in rotating the steering wheel 2 clockwise or counterclockwise.

In this case, the driver who operates the steering wheel 2 on the assumption that the assist device 20 will assist the driver in operating the steering wheel 2 feels a sense of discomfort. In addition, although the spool 74 has not reached the partitioning range, the maximum current AX is continuously supplied on the assumption that the spool 74 is within the partitioning range, so the electric power of the power supply is wasted. That is, in the virtual control device, when the solenoid valve 70 is in the abnormal valve state, there arise problems that the driver feels a sense of discomfort and the electric power of the power supply is wasted.

Therefore, when the abnormal valve state is occurring, it is desirable to detect the abnormal valve state and then to inform the driver that the assist device 20 does not assist the driver in operating the steering wheel 2 and to stop supply of the driving current A to the solenoid 75.

Then, the control device 50 shown in FIG. 1 executes "solenoid position control" in which the spool position S of the solenoid valve 70 is detected and, when the solenoid valve 70 is in the abnormal valve state, supply of the driving current A is stopped, and the driver is informed of the abnormal valve state.

In the solenoid position control, the driving current A that includes an alternating current component is supplied to the solenoid 75, the impedance Z of the solenoid 75 supplied with the driving current A is detected, and then the spool position S is detected on the basis of the detected impedance Z.

When the spool 74 is moved by the magnetic flux generated from the solenoid 75, the impedance Z of the solenoid 75 changes on the basis of the distance between the solenoid 75 and the second valve element 74B of the spool 74. That is, the impedance Z of the solenoid 75 reflects the distance between the solenoid 75 and the spool 74. Therefore, it is possible to detect the position of the second valve element 74B with respect to the solenoid 75 on the basis of the impedance Z of the solenoid 75. Note that the position of the second valve element 74B with respect to the solenoid 75 corresponds to the spool position S.

The impedance Z of the solenoid 75 changes on the basis of the magnetic permeability and dielectric constant near the solenoid 75. The magnetic permeability of the spool 74 (second valve element 74B) is higher than the magnetic permeability of air near the solenoid 75. Therefore, the impedance Z of the solenoid 75 gradually reduces with an increase in the distance between the solenoid 75 and the spool 74 (second valve element 74B).

Figure 8:
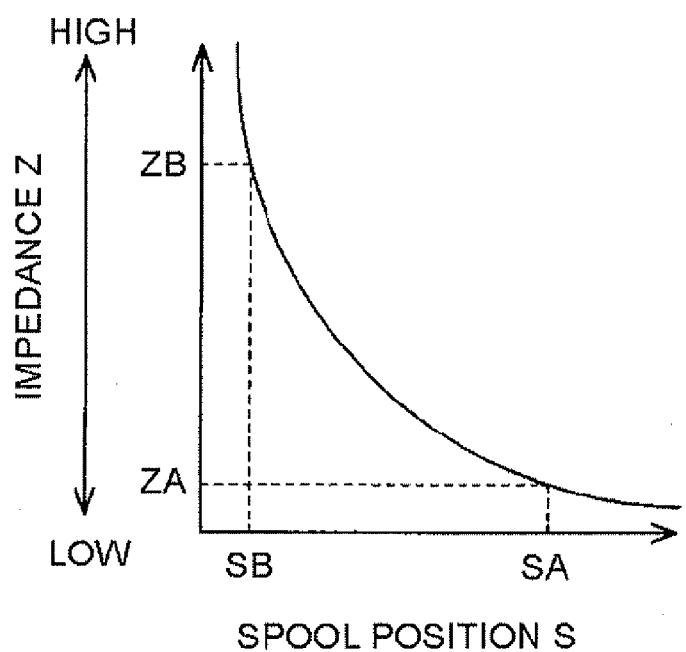
FIG. 8 is a graph that shows the relationship between the position of the spool and the impedance of the solenoid.

FIG. 8 shows an example of the relationship between the impedance Z of the solenoid 75 and the spool position S. Here, where the impedance Z at the time when the spool 74 is at the maximum communication position SA is defined as "minimum impedance ZA" and the impedance Z at the time when the spool 74 is at the maximum partitioning position SB is defined as "maximum impedance ZB", the impedance Z of the solenoid 75 gradually increases as the spool position S is shifted from the maximum communication position SA to the maximum partitioning position SB.

Figure 9:
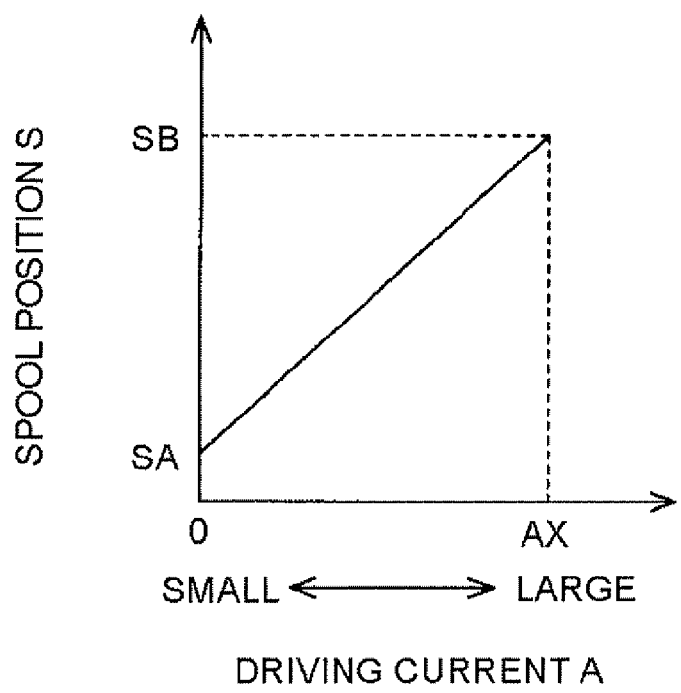
FIG. 9 is a graph that shows the relationship between the driving current supplied to the solenoid and the position of the spool when the solenoid valve is in a normal valve state.

FIG. 9 shows an example of the relationship between the spool position S and the driving current A of the solenoid 75 in the normal valve state. In the normal valve state, the spool position S changes as follows on the basis of the magnitude of the driving current A supplied to the solenoid 75.

That is, when the driving current A is "0", the spool position S is maintained at the maximum communication position SA. In addition, as the driving current A increases toward the maximum current AX, the spool position S changes from the maximum communication position SA toward the maximum partitioning position SB. In addition, when the driving current A is the maximum current AX, the spool position S is maintained at the maximum partitioning position SB.

Figure 10:
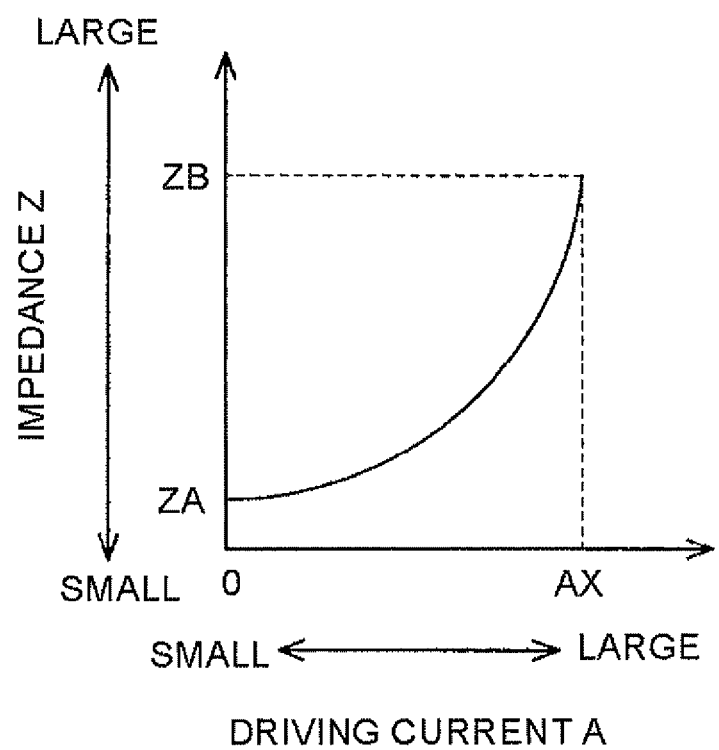
FIG. 10 is a graph that shows the relationship between the driving current supplied to the solenoid and the impedance of the solenoid when the solenoid valve is in the normal valve state.

Therefore, the relationship between the driving current A of the solenoid 75 and the impedance Z of the solenoid 75 in the normal valve state is as shown in FIG. 10. Hereinafter, the relationship between the driving current A and the impedance Z, shown in FIG. 10, is defined as "reference position index".

In the normal valve state, when the driving current A is "0", the impedance Z is the minimum impedance ZA. In addition, as the driving current A increases from "0" toward the maximum current AX, the impedance Z increases from the minimum impedance ZA toward the maximum impedance ZB. In addition, when the driving current A is the maximum current AX, the impedance Z is the maximum impedance ZB.

In solenoid position control, the impedance Z of the solenoid 75 at the time when the driving current A is supplied to the solenoid 75 is detected, and, on the basis of whether the relationship between the supplied driving current A and the detected impedance Z matches the reference position index of FIG. 10, it is determined whether the solenoid valve 70 is placed in the normal valve state or in the abnormal valve state. That is, on the basis of the relationship between the driving current A and the impedance Z, it is determined whether the relationship between the driving current A and the spool position S matches the relationship in the normal valve state, shown in FIG. 9.

Then, when the relationship between the driving current A and the impedance Z matches the reference position index, it is determined that the solenoid valve 70 is in the normal valve state, and the driving current A (maximum current AX) is continuously supplied. On the other hand, when the relationship between the driving current A and the impedance Z does not match the reference position index, it is determined that the solenoid valve 70 is in the abnormal valve state, and supply of the driving current A to the solenoid 75 is stopped. In addition, an indicator lamp (not shown) that indicates that assisting the driver in operating the steering wheel 2 by the assist device 20 is stopped due to an abnormality (abnormal valve state) of the assist device 20 is lit up.

When supply of the driving current A to the solenoid 75 is stopped, force that moves the solenoid 75 toward the maximum partitioning position SB is no longer applied to the spool 74, so the spool 74 is moved toward the maximum communication position SA by the force of the coil spring 76. Thus, the spool position S is held within the communication range, so the hydraulic pressure in the first hydraulic chamber 21A and the hydraulic pressure in the second hydraulic chamber 21B are equal to each other in the hydraulic cylinder 21 shown in FIG. 1. Note that, when the spool 74 is stuck to the housing 71, even when supply of the driving current A is stopped, the spool position S is unlikely to be changed.

Figure 11:
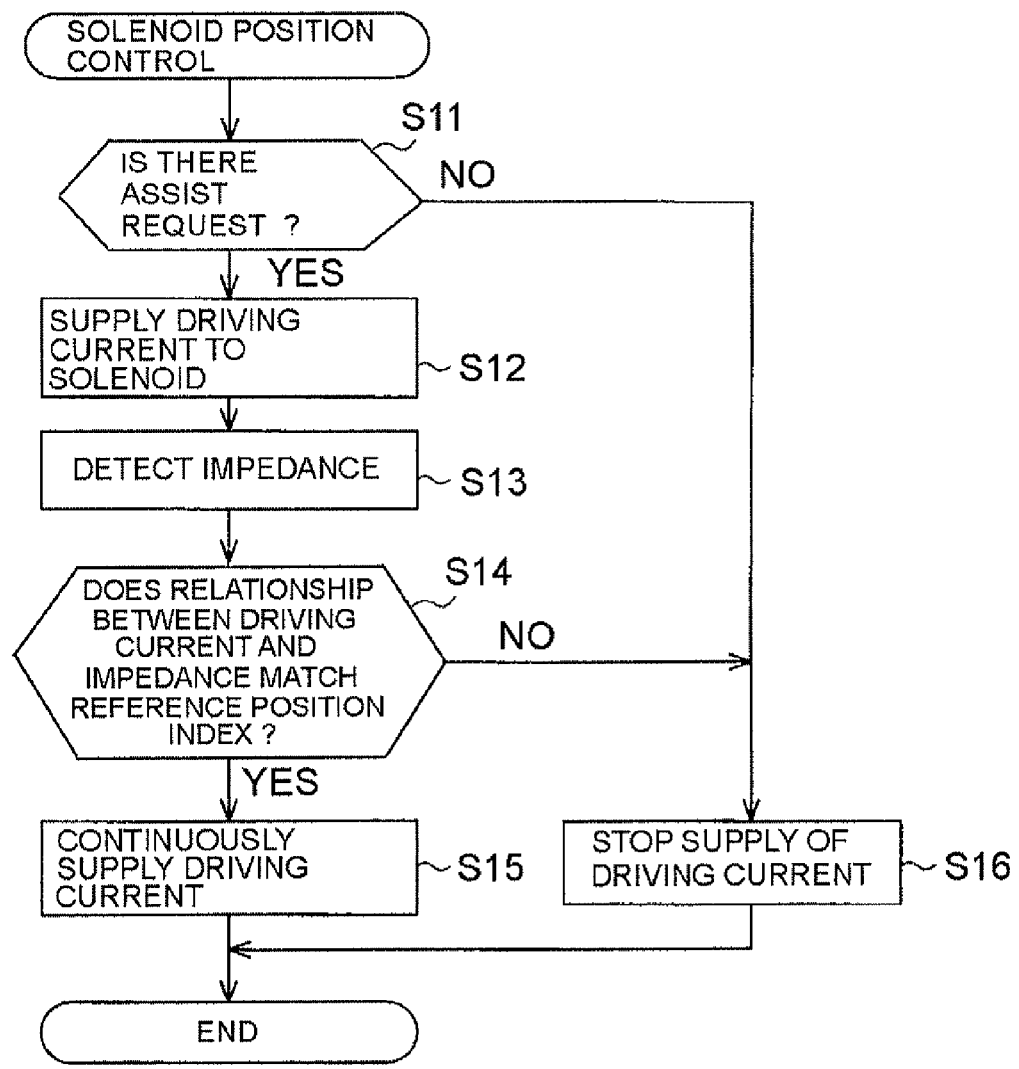
FIG. 11 is a flow chart that shows the procedure of solenoid position control executed by a control device.

The specific procedure of solenoid position control will be described with reference to FIG. 11. Note that the control is repeatedly executed by the control device 50 at predetermined control intervals. That is, execution of the position control is suspended during a period from the completion of the last step until the lapse of the control interval, and then the processes of the position control are executed from the first step again after the lapse of the control interval.

In step S11, it is determined whether a request for the assist device 20 to assist the driver in operating the steering wheel 2 is set. It is determined whether the request is set on the basis of a signal output from the torque sensor 14, a signal output from the steering angle sensor 15, and the like.

In step S12, the maximum current AX is supplied to the solenoid 75. In step S13, the impedance Z of the solenoid 75 is detected. In step S14, it is determined whether the relationship between the driving current A supplied to the solenoid 75 and the detected impedance Z of the solenoid 75 matches the reference position index shown in FIG. 10.

Specifically, the point determined by the driving current A and the impedance Z at that time is plotted on the map of FIG. 10. When the plotted point deviates from the quadratic curve as the reference position index, it is determined that the above relationship does not match the reference position index.

When it is determined in step S14 that the relationship between the driving current A and the impedance Z does not match the reference position index, supply of the driving current A (maximum current AX) to the solenoid 75 is stopped in step S15. In addition, the indicator lamp that indicates that assist by the assist device 20 is stopped is lit up.

When it is determined in step S14 that the relationship between the driving current A and the impedance Z matches the reference position index, supply of the driving current A (maximum current AX) to the solenoid 75 is continued in step S15.

With the hydraulic power steering system 1 according to the present embodiment, the following advantageous effects may be obtained.

(1) The hydraulic power steering system 1 includes the solenoid valve including the solenoid 75 that is supplied with the driving current A to generate magnetic flux, and the spool 74 that is moved by the magnetic flux generated from the solenoid 75, and the control device 50 that controls the solenoid valve 70. The control device 50 includes an alternating current component in the driving current A and supplies the driving current A including the alternating current component to the solenoid 75, and detects the impedance Z of the solenoid 75.

With the above configuration, unlike the configuration in which a mechanical position sensor is used, no mechanical contact with the spool 74 is required to detect the spool position S, so it is possible to suppress interference with the movement of the spool 74, which may be caused when the spool position S is detected. In addition, unlike the configuration in which an optical position sensor is used, the low-cost solenoid valve 70 is utilized to detect the spool position 5, so it is possible to reduce the manufacturing cost of the hydraulic power steering system 1.

(2) In the hydraulic power steering system 1, when the relationship between the supplied driving current A and the detected impedance Z does not match the reference position index shown in FIG. 10, supply of the driving current A to the solenoid 75 is stopped. With the above configuration, when it is difficult to appropriately control the axial position of the spool 74, the likelihood that the spool 74 is held at the communication position by the force of the coil spring 76 increases. Therefore, when the solenoid valve 70 is in the abnormal valve state, the likelihood that the driver who is operating the steering wheel 2 on the assumption that the assist device 20 assists the driver in operating the steering wheel 2 feels a sense of discomfort reduces. In addition, it is possible to reduce the wasted electric power of the power supply due to the driving current A supplied to the solenoid 75.

The invention is not limited to the above illustrated embodiment. For example, the above embodiment may be modified into the following alternative embodiments. In addition, the following alternative embodiments are not applied to only the above described embodiment but they also may be implemented by a combination of the different alternative embodiments.

In the above embodiment (see FIG. 6 and FIG. 7), the coil spring 76 presses the spool 74; however, an elastic member that presses the spool 74 is not limited to the coil spring 76. For example, a leaf spring may be used instead of the coil spring 76.

In the above embodiment, communication is provided between the first space 72A and the second space 72B by de-energizing the solenoid 75; instead, communication may be provided between the first space 72A and the second space 72B by energizing the solenoid 75.

In the above embodiment (see FIG. 3), the solenoid valve 70 is used to provide communication between the first hydraulic chamber 21A and the second hydraulic chamber 21B; however, usage of the solenoid valve 70 is not limited to this.

In the above embodiment (see FIG. 3), the flow-rate control valve 30 includes the torsion bar 36; however, the torsion bar 36 may be omitted. In this case, changing the mode from the first mode or second mode to the third mode may be performed by driving the electric motor 31.

In the above embodiment (see FIG. 4), the flow-rate control valve 30 is configured such that the valve element 34 rotates to change the opening degrees of the ports 61 to 63; instead, a spool valve that includes, for example, a reciprocally movable valve element may be used as the flow-rate control valve.

In the above embodiment (see FIG. 3), the valve that is able to continuously change the sectional area of the oil passage is used as the flow-rate control valve 30; instead, a flow-rate control valve that has no such function, that is, a flow-rate control valve that changes the state between the state where the oil passage is open and the state where the oil passage is closed may also be used.

In the above embodiment (see FIG. 1), hydraulic oil is supplied to the hydraulic cylinder 21 by the electric pump 24 that uses the electric motor 25 as a driving source; however, instead of the electric pump 24, a pump that uses the engine of the vehicle as a driving source may also be used.

What is claimed is:

1. A solenoid valve device, comprising:
a solenoid valve that includes a solenoid that is supplied with driving current to generate magnetic flux, and a valve element that is moved by the magnetic flux generated from the solenoid; and
a control device that controls the solenoid valve, wherein
the control device includes an alternating current component in the driving current and supplies the driving current including the alternating current component to the solenoid, and detects an impedance of the solenoid, and
the control device changes a magnitude of the driving current based on the impedance; wherein the control device sets a relationship between the driving current and the impedance at a time when the driving current matches an operation of the valve element as a reference position index, and stops supply of the driving current to the solenoid when a relationship between the driving current supplied to the solenoid and the impedance detected as the driving current is supplied differs from the reference position index.

2. A hydraulic apparatus, comprising:
a cylinder having an internal space to which hydraulic oil is supplied;
a piston that partitions the internal space into a first hydraulic chamber and a second hydraulic chamber;
a communication oil passage that provides communication between the first hydraulic chamber and the second hydraulic chamber; and
a solenoid valve device that is provided in the communication oil passage and that includes: a solenoid valve that includes a solenoid that is supplied with driving current to generate magnetic flux, and a valve element that is moved by the magnetic flux generated from the solenoid; and a control device that controls the solenoid valve, wherein
the control device includes an alternating current component in the driving current and supplies the driving current including the alternating current component to the solenoid, and detects an impedance of the solenoid, the control device changing a magnitude of the driving current based on the impedance,
the solenoid valve of the solenoid valve device opens and closes the communication oil passage,
the solenoid valve includes a housing that accommodates the valve element,
when a position of the valve element with respect to the housing is within a partitioning range, the communication oil passage is closed, and
when the position of the valve element with respect to the housing is within a communication range, the communication oil passage is opened; wherein the control device sets a relationship between the driving current and the impedance at a time when the driving current matches an operation of the valve element as a reference position index, and stops supply of the driving current to the solenoid when a relationship between the driving current supplied to the solenoid and the impedance detected as the driving current is supplied differs from the reference position index.

3. The hydraulic apparatus according to claim 2, further comprising:
a first oil passage that provides communication between the solenoid valve and the first hydraulic chamber; and
a second oil passage that provides communication between the solenoid valve and the second hydraulic chamber, wherein
the communication oil passage is formed so as to include the first oil passage, the second oil passage and a space inside the housing,
when the valve element is within the partitioning range, flow of hydraulic oil between the first oil passage and the second oil passage is interrupted, and
when the valve element is within the communication range, communication is provided between the first oil passage and the second oil passage via the space inside the housing.

4. The hydraulic apparatus according to claim 3, further comprising:
an electric pump that supplies hydraulic oil to the cylinder;
a flow-rate control valve that is provided between the electric pump and the solenoid valve, and that adjusts an amount of hydraulic oil supplied to the cylinder;
a third oil passage that provides communication between the solenoid valve and the flow-rate control valve, and that is associated with the first oil passage,
a fourth oil passage that provides communication between the solenoid valve and the flow-rate control valve, and that is associated with the second oil passage, wherein
when the valve element is within the partitioning range, communication is provided between the third oil passage and the first oil passage, communication is provided between the fourth oil passage and the second oil passage, flow of hydraulic oil between the third oil passage and the second oil passage is interrupted, and flow of hydraulic oil between the fourth oil passage and the first oil passage is interrupted.

5. The hydraulic apparatus according to claim 2, wherein
the solenoid valve includes an elastic member that applies force, pressing the valve element from the partitioning range toward the communication range, to the valve element, and
when the driving current is not supplied to the solenoid, the valve element is placed within the communication range by the force of the elastic member.

6. A hydraulic power steering system including a hydraulic apparatus, the hydraulic apparatus comprising:
a cylinder having an internal space to which hydraulic oil is supplied;
a piston that partitions the internal space into a first hydraulic chamber and a second hydraulic chamber;
a communication oil passage that provides communication between the first hydraulic chamber and the second hydraulic chamber; and
a solenoid valve device that is provided in the communication oil passage and that includes: a solenoid valve that includes a solenoid that is supplied with driving current to generate magnetic flux, and a valve element that is moved by the magnetic flux generated from the solenoid; and a control device that controls the solenoid valve, wherein
the control device includes an alternating current component in the driving current and supplies the driving current including the alternating current component to the solenoid, and detects an impedance of the solenoid, the control device changing a magnitude of the driving current based on the impedance,
the solenoid valve of the solenoid valve device opens and closes the communication oil passage,
the solenoid valve includes a housing that accommodates the valve element,
when a position of the valve element with respect to the housing is within a partitioning range, the communication oil passage is closed, and
when the position of the valve element with respect to the housing is within a communication range, the communication oil passage is opened; wherein the control device sets a relationship between the driving current and the impedance at a time when the driving current matches an operation of the valve element as a reference position index, and stops supply of the driving current to the solenoid when a relationship between the driving current supplied to the solenoid and the impedance detected as the driving current is supplied differs from the reference position index.

7. The hydraulic power steering system according to claim 6, further comprising:
an electric pump that supplies hydraulic oil to the cylinder;
a flow-rate control valve that is provided between the electric pump and the solenoid valve, and that adjusts an amount of hydraulic oil supplied to the cylinder,
a first oil passage that provides communication between the solenoid valve and the flow-rate control valve, and that is associated with a second oil passage that provides communication between the solenoid valve and the first hydraulic chamber,
a third oil passage that provides communication between the solenoid valve and the flow-rate control valve, and that is associated with a fourth oil passage that provides communication between the solenoid valve and the second hydraulic chamber, wherein
when the valve element is within the partitioning range, communication is provided between the first oil passage and the second oil passage, communication is provided between the third oil passage and the fourth oil passage, flow of hydraulic oil between the first oil passage and the fourth oil passage is interrupted, and flow of hydraulic oil between the third oil passage and the second oil passage is interrupted,
the piston is fixed to a steered shaft,
the flow-rate control valve includes: a housing having a first port that is in communication with the first oil passage and a second port that is in communication with the third oil passage and another valve element that rotates with respect to the housing to change an opening degree of the first port and an opening degree of the second port, and
an amount of hydraulic oil supplied to the first hydraulic chamber and an amount of hydraulic oil supplied to the second hydraulic chamber are changed based on a rotational position of the other valve element with respect to the housing in the flow-rate control valve.

8. The hydraulic power steering system according to claim 7, wherein
the solenoid valve includes an elastic member that applies force, pressing the valve element from the partitioning range toward the communication range, to the valve element, and
when the driving current is not supplied to the solenoid, the valve element is placed within the communication range by the force of the elastic member.

9. The hydraulic power steering system according to claim 7, further comprising:
- a supply oil passage that provides communication between the electric pump and the flow-rate control valve;
- a drain oil passage that drains hydraulic oil from the housing of the flow-rate control valve;
- a supply port that is in communication with the supply oil passage inside the housing of the flow-rate control valve; and
- a drain port that is in communication with the drain oil passage inside the housing of the flow-rate control valve, wherein
- when the rotational position of the other valve element with respect to the housing in the flow-rate control valve coincides with a first supply position, the supply port is in communication with the first port and the drain port is in communication with the second port, and
- when the rotational position of the other valve element with respect to the housing in the flow-rate control valve coincides with a second supply position, the drain port is in communication with the first port and the supply port is in communication with the second port.

10. The hydraulic power steering system according to claim 6, wherein
the piston is connected to a steered shaft that turns a wheel.

* * * * *